(12) United States Patent
Uchida

(10) Patent No.: US 11,960,177 B2
(45) Date of Patent: Apr. 16, 2024

(54) DISPLAY DEVICE

(71) Applicant: Japan Display Inc., Tokyo (JP)

(72) Inventor: Makoto Uchida, Tokyo (JP)

(73) Assignee: Japan Display Inc., Tokyo (JP)

( * ) Notice: Subject to any disclaimer, the term of this patent is extended or adjusted under 35 U.S.C. 154(b) by 584 days.

(21) Appl. No.: 17/161,753

(22) Filed: Jan. 29, 2021

(65) Prior Publication Data
US 2021/0149257 A1 May 20, 2021

Related U.S. Application Data

(63) Continuation of application No. PCT/JP2019/027825, filed on Jul. 12, 2019.

(30) Foreign Application Priority Data

Aug. 2, 2018 (JP) ................. 2018-146127

(51) Int. Cl.
*G02F 1/1345* (2006.01)
*G02F 1/1343* (2006.01)
*G02F 1/1362* (2006.01)
*G02F 1/1368* (2006.01)
*G02F 1/1339* (2006.01)

(52) U.S. Cl.
CPC .. *G02F 1/134363* (2013.01); *G02F 1/136227* (2013.01); *G02F 1/136286* (2013.01); *G02F 1/13685* (2021.01); *G02F 1/13396* (2021.01)

(58) Field of Classification Search
CPC ........... G02F 1/134363; G02F 1/13685; G02F 1/136227; G02F 1/136286; G02F 1/13396; G02F 1/1343; G02F 1/1362; G02F 1/1368; G09F 9/30; G09F 9/302; G09F 9/33
See application file for complete search history.

(56) References Cited

U.S. PATENT DOCUMENTS

| 10,656,482 | B2 * | 5/2020 | Kawabuchi ....... G02F 1/136227 |
| 2009/0059110 | A1 | 3/2009 | Sasaki et al. |
| 2017/0329176 | A1 * | 11/2017 | Kawabuchi ....... G02F 1/133512 |
| 2018/0059473 | A1 | 3/2018 | Uchida |
| 2018/0120658 | A1 | 5/2018 | Kanaya |

FOREIGN PATENT DOCUMENTS

| JP | 2009-058913 A | 3/2009 |
| JP | 2018-036315 A | 3/2018 |
| JP | 2018-072537 A | 5/2018 |

OTHER PUBLICATIONS

International Search Report dated Sep. 24, 2019 for the PCT application No. PCT/JP2019/027825, with English translation.

* cited by examiner

*Primary Examiner* — Nikolay K Yushin
(74) *Attorney, Agent, or Firm* — Michael Best & Friedrich LLP

(57) ABSTRACT

According to one embodiment, a display device includes a first insulating layer, a first source line and a second source line, an organic insulating layer including a contact hole, a drain electrode located on the first insulating layer and exposed from the organic insulating layer in the contact hole, a conductive material covering the drain electrode in the contact hole, a second insulating layer located on the organic insulating layer, and a pixel electrode located above the second insulating layer and in the contact hole, and electrically connected to the drain electrode, the conductive material being in contact with the first insulating layer exposed from the organic insulating layer in the contact hole.

15 Claims, 10 Drawing Sheets

F.I.G. 4

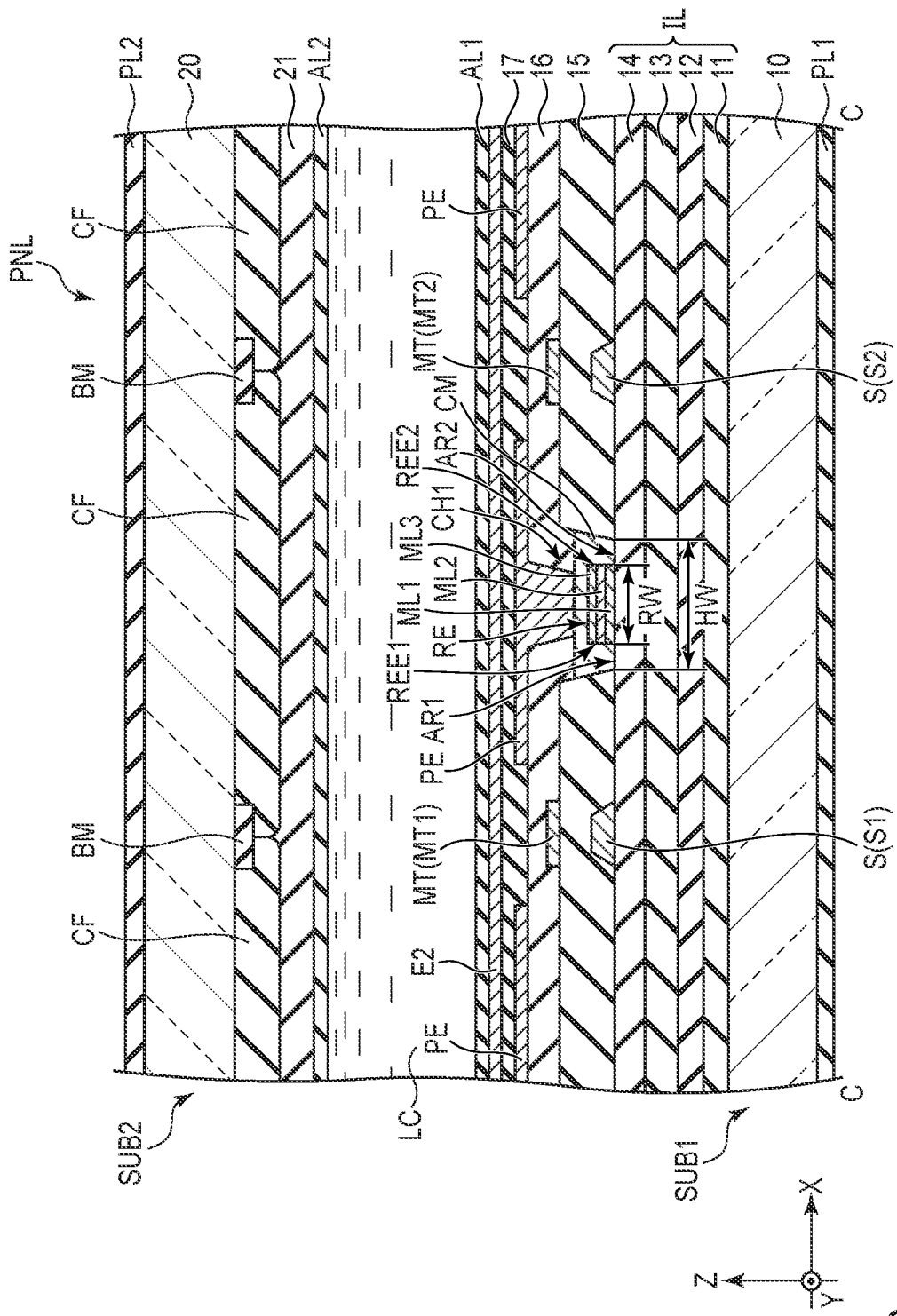
F I G. 6

DISPLAY DEVICE

CROSS-REFERENCE TO RELATED APPLICATIONS

This application is a Continuation Application of PCT Application No. PCT/JP2019/027825, filed Jul. 12, 2019 and based upon and claiming the benefit of priority from Japanese Patent Application No. 2018-146127, filed Aug. 2, 2018, the entire contents of all of which are incorporated herein by reference.

FIELD

Embodiments described herein relate generally to a display device.

BACKGROUND

Recently, as the virtual reality (VR) becomes more widely popular, there is an increasing demand for super high-definition display devices. The super high-definition display devices comprise pixels whose sizes are smaller as compared to those of the conventional display devices. Therefore, a portion covered by an insulating layer or the like in a conventional display device can be exposed from the insulating layer or the like in a super high-definition display device.

BRIEF DESCRIPTION OF THE DRAWINGS

FIG. 6 is a cross-sectional view of the display panel taken along line C-C in FIG. 3.

DETAILED DESCRIPTION

Figure 1:
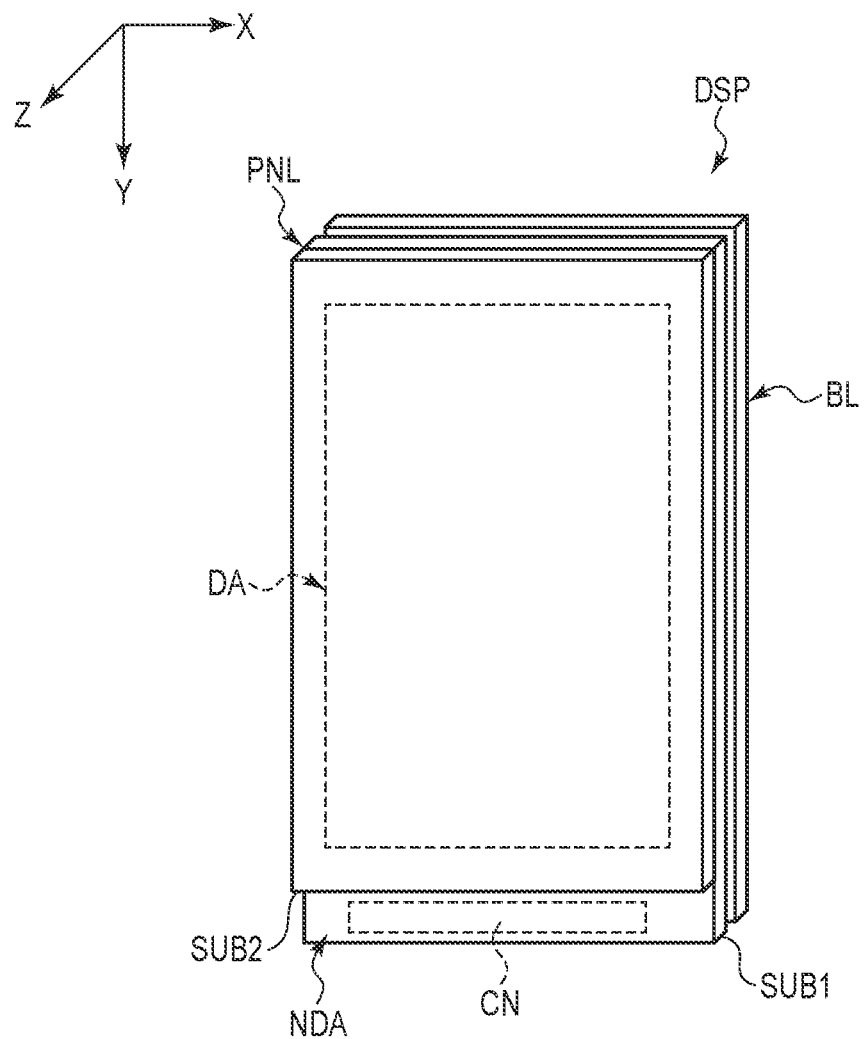
FIG. 1 is a perspective diagram showing an example of an appearance of a liquid crystal display device according to the first embodiment.

In general, according to one embodiment, a display device comprises a first insulating layer, a first source line and a second source line located on the first insulating layer and arranged with an interval therebetween, an organic insulating layer located on the first insulating layer, the first source line and the second source line and comprising a contact hole, a drain electrode located on the first insulating layer between the first source line and the second source line and exposed from the organic insulating layer in the contact hole, a conductive material covering the drain electrode in the contact hole, a second insulating layer located on the organic insulating layer and a pixel electrode located above the second insulating layer and in the contact hole, and in direct contact with the conductive material and electrically connected to the drain electrode, and the conductive material being in contact with the first insulating layer exposed from the organic insulating layer between the organic insulating layer and the drain electrode in the contact hole.

According to another embodiment, a display device comprises a first insulating layer, a first source line and a second source line located on the first insulating layer and arranged with an interval therebetween, an organic insulating layer located on the first insulating layer, the first source line and the second source line and comprising a contact hole, a drain electrode located on the first insulating layer between the first source line and the second source line and comprising a first end portion on a side of the first source line exposed from the organic insulating layer in the contact hole and a second end portion on a side of the second source line and a conductive material covering the first end portion and the second end portion in the contact hole, a second insulating layer located on the organic insulating layer and a pixel electrode located on the second insulating layer and in the contact hole, in direct contact with the conductive material, and electrically connected to the drain electrode.

According to still another embodiment, a display device comprises: a first insulating layer; a first source line and a second source line located on the first insulating layer and arranged with an interval therebetween; an organic insulating layer located on the first insulating layer, the first source line and the second source line and comprising a contact hole; a drain electrode located on the first insulating layer between the first source line and the second source line and exposed from the organic insulating layer in the contact hole; a conductive material covering the drain electrode in the contact hole; a second insulating layer located on the organic insulating layer; a pixel electrode located on the second insulating layer and electrically connected to the drain electrode; a first electrode located between the organic insulating layer and the second insulating layer; and a first metal wiring line overlapping the first source line and in contact with the first electrode, the conductive material being in contact with the first insulating layer exposed from the organic insulating layer between the organic insulating layer and the drain electrode in the contact hole, and the conducting material containing at least one of a first material same as that of the first electrode and a second material same as that of the first metal wiring line.

Embodiments will be described hereinafter with reference to the accompanying drawings. The disclosure is a mere example, and arbitrary change of gist which can be easily conceived by a person of ordinary skill in the art naturally falls within the inventive scope. To more clarify the explanations, the drawings may pictorially show width, thickness, shape and the like, of each portion as compared with an actual aspect, but they are mere examples and do not restrict the interpretation of the invention. In the present specification and drawings, elements like or similar to those in the already described drawings may be denoted by similar reference numbers and their detailed descriptions may be arbitrarily omitted.

In the embodiments, a display device is disclosed as an example of the electronic devices. This display device can be used for various kinds of devices, for example, a virtual reality (VR) viewer, a smartphone, a tablet terminal, a portable telephone terminal, a notebook computer, a game console and the like.

FIG. 1 is a perspective diagram showing an example of an appearance of the liquid crystal display device DSP according to the first embodiment. A first direction X, a second direction Y, and a third direction Z are orthogonal to each other, but may intersect at an angle other than ninety degrees. The first direction X and the second direction Y correspond to a direction parallel to a main surface of a substrate which constitutes a liquid crystal display device (to be referred to simply as display device) DSP, and the third direction Z corresponds to the thickness direction of the display device DSP. Here, a plane view of the display device DSP in an X-Y plane defined by the first direction X and the second direction Y is illustrated. In the following discussion, a plan view means that an X-Y plane is viewed from the third direction Z.

The display device DSP comprises a display panel PNL and an illumination device BL.

The display panel PNL comprises a first substrate SUB1, a second substrate SUB2 opposing the first substrate SUB1 and a liquid crystal layer, which is a liquid crystal layer LC described below held between the first substrate SUB1 and the second substrate SUB2. Further, the display panel PNL comprises a display area DA and a non-display area NDA. The display area DA is an area which displays images. The display area DA is located in substantially a center of a region where the first substrate SUB1 and the second substrate SUB2 oppose each other. The non-display area NDA is an area where images are not displayed, and is located outside the display area DA.

The first substrate SUB1 comprises a connection portion CN. The connection portion CN comprises terminals for connecting signal supply sources such as a flexible printed-circuit board, IC chip and the like. The connection portion CN is located in the non-display area NDA.

The illumination device BL is disposed on a rear surface side (an opposite side of the surface opposing the second substrate SUB2) of the first substrate SUB1. As such an illumination device BL, various kinds of forms are applicable. For example, the illumination device BL comprises a light guide opposing the first substrate SUB1, a plurality of light sources such as light emitting diodes (LEDs), disposed along an end portion of the light guide, a reflective sheet disposed on a main surface side of the light guide, and various optical sheets stacked on another main surface side of the light guide and the like.

Note that the display panel PNL of the illustrated example is of a transmissive type which displays images by selectively transmitting light from the illumination device BL, but it is not limited to this. For example, the display panel PNL may be a reflective type which displays images by selectively reflecting external light or light from on external light source or may be a transreflective type provided for both transmissive and reflective display functions.

Further, a detailed explanation of the configuration of the display panel PNL is omitted here, but any one of a display mode which uses a vertical electric field along a normal of the display panel PNL, a display mode which uses an inclined electric field inclined along the normal of the display panel PNL and a display mode which uses a lateral electric field along the main surface of the display panel PNL is also applicable.

In this embodiment, a direction from the first substrate SUB1 towards the second substrate SUB2 is defined as an upward direction (or, simply, up) and a direction from the second substrate SUB2 towards the first substrate SUB1 is defined as a downward direction (or simply, down).

Figure 2:
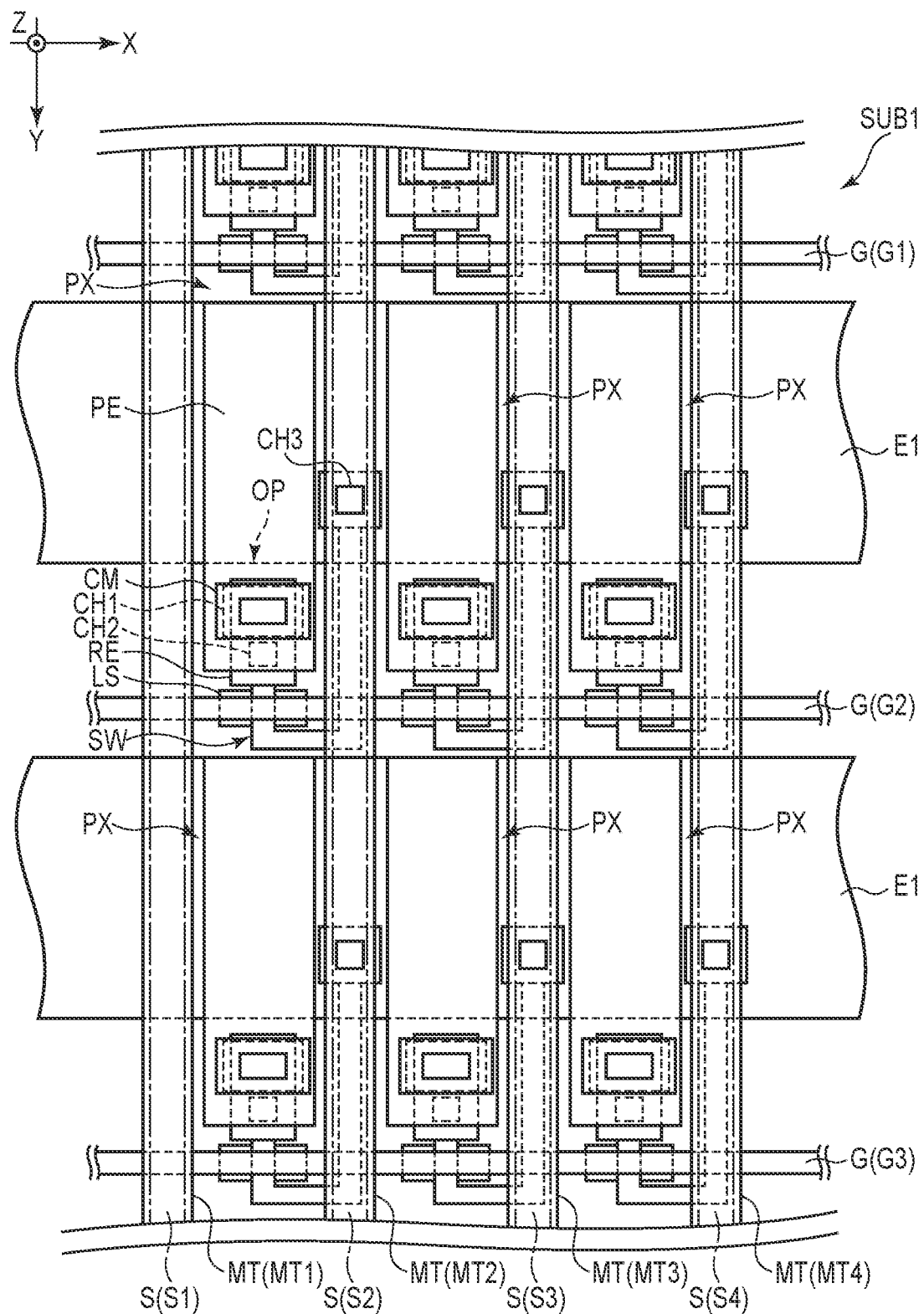
FIG. 2 is a plan view schematically showing a first substrate according to the first embodiment.

FIG. 2 is a plan view schematically showing the first substrate SUB1 according to the first embodiment. FIG. 2 shows a main portion of the first substrate SUB1. Here, a configuration example in which a fringe field switching (FFS) mode, which is one of the display modes which use the lateral electric field will be described.

The first substrate SUB1 comprises a plurality of gate lines G (G1, G2, G3, . . . ), a plurality of light-shielding layers LS, a plurality of source lines S (S1, S2, S3, S4, . . . ), switching elements SW, drain electrodes RE, pixel electrodes PE, electrically-conductive materials CM, metal wiring lines MT, first electrodes E1, second electrodes E2 and the like. Note that FIG. 2 shows only the part of the configuration necessary for the explanation, and the illustration of the second electrodes E2 and the like is omitted.

The plurality of gate lines G (G1, G2, G3, . . . ) are arranged along the second direction Y with predetermined intervals therebetween. The plurality of gate lines G (G1, G2, G3, . . . ) each extend along the first direction X and are formed into a linear manner. Note that the gate lines G (G1, G2, G3, . . . ) may be partially bent. The gate lines G (G1, G2, G3, . . . ) are of, for example, molybdenum-tungsten alloy film. In plan view, the gate lines G overlap the light-shielding layers LS, respectively.

The plurality of source lines S (S1, S2, S3, S4, . . . ) are arranged along the first direction X with predetermined intervals therebetween. The source lines S (S1, S2, S3, S4, . . . ) each extend along the second direction Y. Note that the source line S (S1, S2, S3, S4, . . . ) may be partially bent. The source lines S (S1, S2, S3, S4, . . . ) are of, for example, a three-level stacked film of titanium/aluminum/titanium, a three-level stacked film of aluminum/titanium/aluminum, or the like. In the drawings, each subpixel PX is equivalent to a region sectioned by each adjacent pair of gate lines G and each respective adjacent pair of source lines S. For example, each subpixel PX is equivalent to a region sectioned by a gate line G1 and a gate line G2, and a source line S1 and a source line S2.

The light-shielding layers LS respectively overlap the gate lines G and are arranged along the respective gate lines G with intervals therebetween along the first direction X. In other words, the light-shielding layers LS overlap the gate lines G and are arranged in an island manner along the gate lines G. In the example illustrated, the light-shielding layers LS each overlap the respective gate line G between two source lines S adjacent to each other along the first direction X. Note that the light-shielding layers LS each may be formed linearly to extend in the first direction X along the gate lines G (G1, G2, G3, . . . ), respectively. Further, the light-shielding layers LS may be partially bent. The light-shielding layers LS are formed of, for example, a molybdenum-tungsten alloy. In the example illustrated, the width of the light-shielding layers LS along the second direction Y is greater than the width of the gate lines G along the second direction Y.

A switching element SW is disposed in each subpixel PX. The switching element SW is electrically connected to the respective gate line G and the respective source line S. In the example illustrated, the switching element SW intersect the gate line G in two locations in each subpixel PX. Note that the switching element SW may intersect the gate line G in one location in each subpixel PX. The details about the switching element SW will be provided later.

A drain electrode RE is disposed in each subpixel PX. In the example illustrated, the drain electrode RE is located between respective two gate lines G adjacent to each other along the first direction X and between respective two source lines S adjacent to each other along the second direction Y. The drain electrode RE is electrically connected to the switching element SW.

A pixel electrodes PE is disposed in each subpixel PX. In the example illustrated, the pixel electrode PE is located between respective two gate lines G adjacent to each other along the first direction X and between respective two source lines S adjacent to each other along the second direction Y. The pixel electrode PE is electrically connected to the drain electrode RE. A potential corresponding to an image signal is applied to the pixel electrode PE. In the example illustrated, the pixel electrode PE has a rectangular flat plate shape without any slit or the like, and extends substantially parallel to the respective source line S. Note that the pixel electrode PE being a rectangular flat plate shape without any slit or the like is only an example, but it may be a shape with a slit or the like, or some other shape. The conductive material CM overlaps the drain electrode RE. The drawing illustrates a contact hole CH1 in an opening portion OP located between respective two first electrodes E1 adjacent to each other along the second direction Y and electrically connecting the conductive material CM and the drain electrode RE to the pixel electrode PE. The contact hole CH1 overlaps the drain electrode RE, the pixel electrode PE and the conductive material CM. Further, a contact hole CH2 is also illustrated, which electrically connects the drain electrode RE and the switching element SW to each other. Furthermore, a contact hole CH3 is illustrated, which electrically connects the switching element SW and the source line S to each other.

Each first electrode E1 is disposed across a plurality of subpixels PX. In the example illustrated, the first electrodes E1 each extend in a belt-like manner along the first direction X on the X-Y plane and are arranged along the second direction Y with intervals therebetween. In plan view, each first electrode E1 overlaps the respective source line S, the respective pixel electrode PE and the like between respective two gate lines adjacent to each other along the second direction Y. Note that the first electrodes E1 may extend into a plane manner along the first direction X and the second direction Y on the X-Y plane. For example, the first electrodes E1 may overlap the source lines S, the gate lines G, the light-shielding layers LS, the drain electrodes RE, the pixel electrodes PE and the like, respectively. The first electrodes E1 each are, for example, a common electrode to which a common potential is applied.

A plurality of metal wiring lines MT (MT1, MT2, MT3, MT4, . . . ) are arranged along the first direction X with predetermined intervals therebetween. The metal wiring lines MT (MT1, MT2, MT3, MT4, . . . ) each extend along the second direction Y. Note that the metal wiring lines MT may be partially bent. The metal wiring lines MT are formed of a metallic material such as molybdenum (Mo), an alloy mainly composed of molybdenum, in which metallic materials are amalgamated together, or the like. The metal wiring lines MT overlap the source lines S, the first electrodes E1 and the like, respectively.

Figure 3:
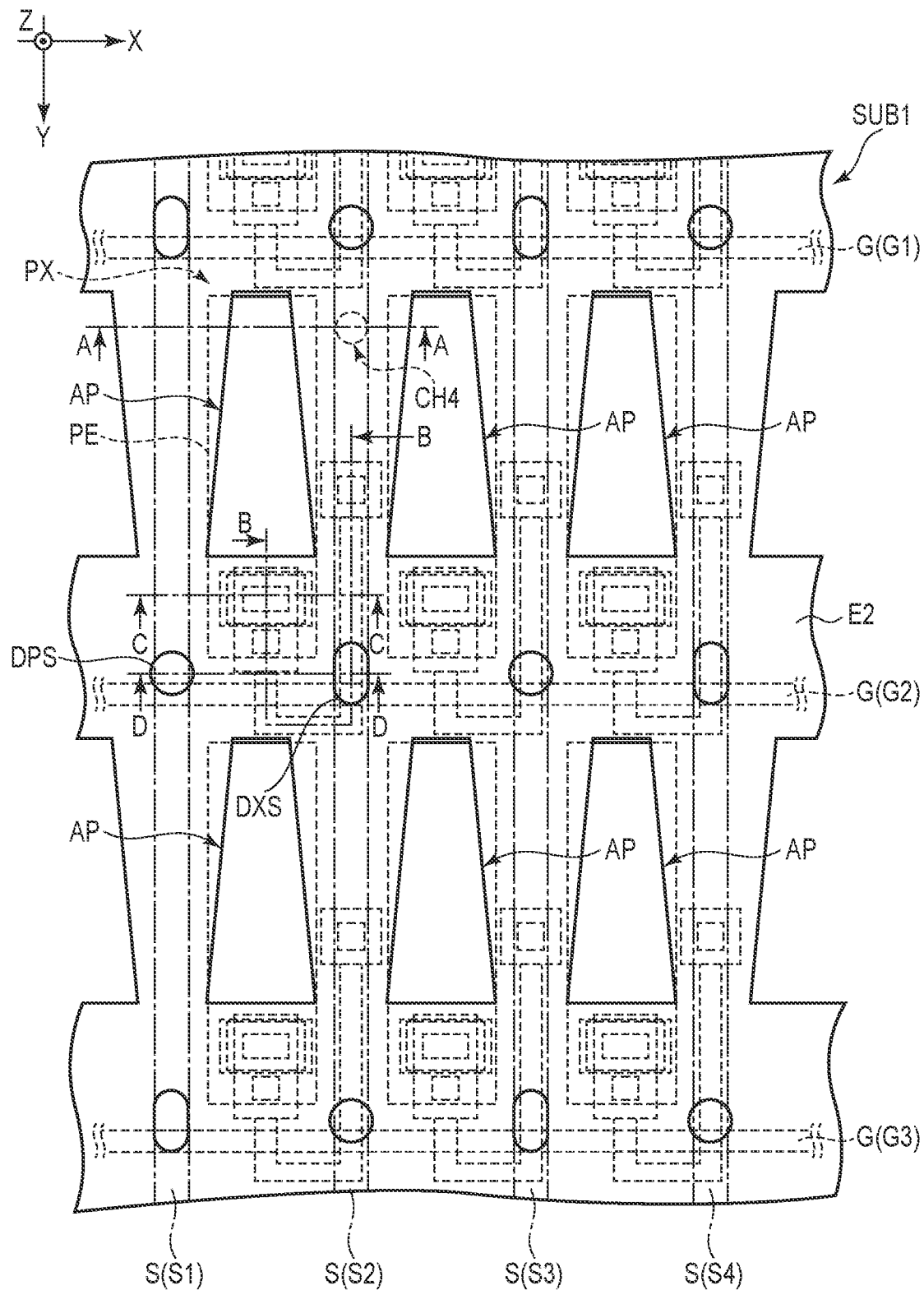
FIG. 3 is a plan view showing a second electrode of the first substrate according to the first embodiment.

FIG. 3 is a plan view showing the second electrode E2 of the first substrate SUB1 according to the first embodiment. Herein, the main portion of the first substrate SUB1 shown in FIG. 2 is illustrated with a dotted line, an alternate long and short dash line and the like.

The first substrate SUB1 comprises second electrodes E2, spacers DPS and DXS and the like. The second electrodes E2 are each formed into a lattice form on the X-Y plane. The second electrodes E2 each comprise a plurality of apertures AP. The apertures AP each extend in the second direction Y along the source lines S, respectively. The apertures AP each comprise two edges opposing each other along the first direction X and not parallel (non-parallel) to each other. In the example illustrated, the apertures AP are each formed into a trapezoidal shape. Note that the apertures AP may be formed into a triangle form, or some other shapes than a trapezoidal shape or a triangle shape. For example, in plan view, each aperture AP overlaps the respective pixel electrode PE. Note that in plan view, the aperture AP may overlap over an entire width of the second electrode E2 along the second direction Y. Further, for example, in plan view, the second electrode E2 overlaps the respective source lines S in a portion between the respective two apertures AP adjacent to each other along the first direction X. Further, in plan view, for example, the second electrode E2 overlaps the respective drain electrode RE, gate line G and the like in a portion between two apertures AP adjacent to each other along the second direction Y. The drawing illustrates a contact hole CH4 which electrically connects the first electrode E1 and the second electrode E2 to each other. Note that the contact hole CH4 may be formed in some other location and, for example, it may be formed in the non-display area NDA. The second electrode E2 is, for example, a common electrode to which a common potential equal to that of the first electrode E1 is applied.

The spacers DXS extends further than the spacers DPS. The spacers DPS and the spacers DXS overlap the second electrode E2. In the example illustrated, the spacers DXS extend in the second direction Y further than the spacers DPS. The spacers DXS have an elliptic shape elongated along the second direction Y. The spacers DPS have a circular shape. Note that the spacers DXS may extend in the first direction X further than the spacer DPS. The spacers DXS need not be elliptic. Further, the spacers DPS need not be circular. The spacers DPS and the spacers DXS overlap the second electrode E2. The spacers DPS and the spacers DXS are placed in positions where the respective source lines S and the respective gate lines G intersect each other. The spacers DPS and the spacers DXS are placed alternately along the first direction X. Further, the spacers DPS and the spacers DXS are placed alternately along the second direction Y. Note that the spacers DPS and DXS need not to be placed alternately along the first direction X and the second direction Y and may be arranged with intervals of a distance by an amount corresponding to a plurality of subpixels. Further, it suffices if at least one side of the spacers DPS and DXS are disposed.

Figure 4:
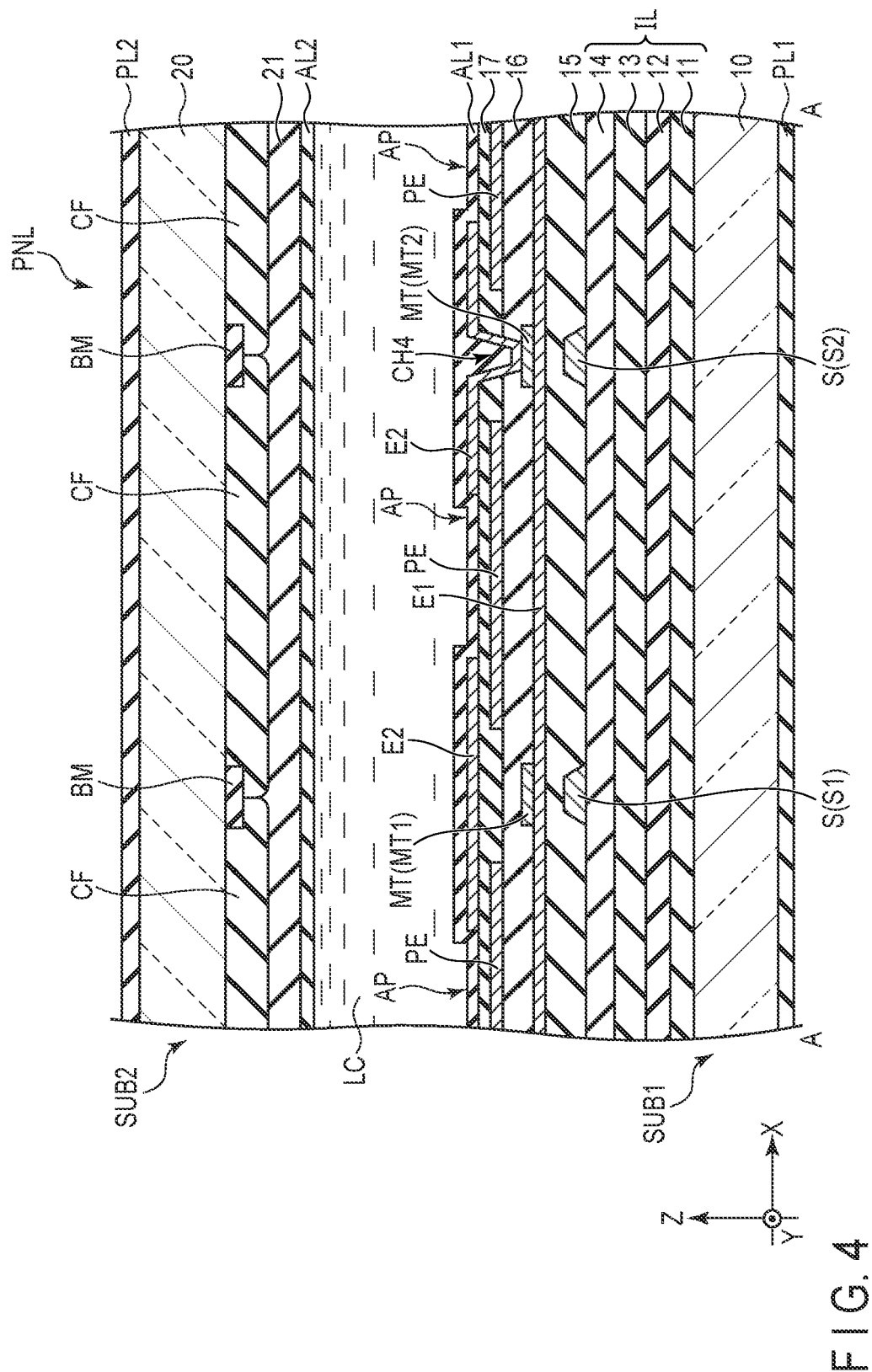
FIG. 4 is a cross-sectional view of a display panel taken along line A-A in FIG. 3.

FIG. 4 is a cross-sectional view of the display panel PNL taken along line A-A in FIG. 3.

The first substrate SUB1 comprises a support substrate 10, insulating layers 11, 12, 13, 14, 15, 16 and 17, source lines S (S1 and S2), a first electrode E1, metal wiring lines MT (MT1 and MT2), a pixel electrode PE, a second electrode E2, an alignment film AL1 and the like. The polarizer PL1 is provided under the support substrate 10. Note that the insulating layers 11 to 17 may be each expressed as an intermediate insulating layer.

The support substrate 10 is transparent, and for example, is of a glass-made such as of borosilicate glass, but it may be of a resin-made such as of plastic or the like.

The insulating layers 11 to 17 are all transparent. The insulating layers 11 to 14, 16 and 17 each are an inorganic insulating layer, and are made of, for example, silicon nitride or silicon oxide. The insulating layer 15 is an organic insulating layer, and is made of, for example, a resin such as acryl resin. The insulating layer 11 is located on the support substrate 10 to as be in contact with the support substrate 10. The insulating layer 12 is located on the insulating layer 11 so as to be in contact with the insulating layer 11. The insulating layer 13 is located on the insulating layer 12 so as to be in contact with the insulating layer 12. The insulating layer 14 is located on the insulating layer 13 so as to be in contact with the insulating layer 13. The source lines S1 and S2 are located on the insulating layer 14 so as to be in contact with the insulating layer 14. The source line S1 and the source line S2 are arranged along the first direction X with an interval therebetween. The insulating layer 15 are located on the insulating layer 14 and the source lines S1 and S2 so as to be in contact with the insulating layer 14 and the source lines S1 and S2. Note that the insulating layers 11 to insulating layer 14 may be referred to an insulating layer IL as one integrated member.

The first electrode E1 is located on the insulating layer 15 so as to be in contact with the insulating layer 15. In other words, the first electrode E1 is located between the insulating layer 15 and the insulating layer 16. The first electrode E1 extends over a plurality of pixel electrodes PE. Note that the first electrode E1 is made of, for example, a transparent conductive material such as indium tin oxide (ITO), indium zinc oxide (IZO), indium gallium oxide (IGO) or the like. Note that it suffices if a portion of the first electrode E1, which overlaps the area contributing to display is transparent, and the other portion may be of a nontransparent material. The metal wiring lines MT1 and MT2 are located on the first electrode E1 so as to be in contact with the first electrode E1. The metal wiring line MT1 is located directly above the source line S1. The metal wiring line MT2 is located directly above the source line S2. Note that the metal wiring lines MT1 and MT2 are located between the insulating layer 15 and the first electrode E1 and may be in contact with the first electrode E1. Further, the metal wiring lines MT1 and MT2 may be located in a layer above the insulating layer 16, which will be described below. The insulating layer 16 is located on the first electrode E1 and the metal wiring lines MT1 and MT2 so as to be in contact with the first electrode E1 and the metal wiring lines MT1 and MT2. The metal wiring lines MT (MT1 and MT2) can contribute to, for example, prevention of mixture of colors, decreasing the resistance of the first electrode E1 and the like.

The pixel electrodes PE are located on the insulating film 16. In the example illustrated, a plurality of pixel electrodes PE are arranged along the first direction X with intervals therebetween. The pixel electrodes PE are not located on the source line S1 or S2. The pixel electrodes PE have a potential different from that of the first electrode E1. The pixel electrodes PE are made of a transparent conductive material and, for example, they are formed of the same material as that of the first electrode E1. Note that it suffices if a portion of the pixel electrode PE, which overlaps the area contributing to display is transparent, and the other portion may be of a nontransparent material.

The insulating layer 17 are located on the insulating layer 16 and the pixel electrodes PE so as to be in contact with the insulating layer 16 and the pixel electrodes PE.

The second electrode E2 is located on the insulating layer 17 so as to be in contact with the insulating layer 17. In the example illustrated, the apertures AP and the pixel electrodes PE respectively oppose each other through the insulating layer 17. The second electrode E2 extends to the contact hole CH4 described above so as to be in contact with the metal wiring lines MT in the contact hole CH4. The second electrode E2 is electrically connected to the first electrode E1 through the metal wiring lines MT. In the example illustrated, the second electrode E2 is in contact with the metal wiring line MT2 in the contact hole CH4. The second electrode E2 is electrically connected to the first electrode E1 through the metal wiring line MT2. The contact hole CH4 penetrates the insulating layers 16 and 17 to reach the metal wiring lines MT. In the example illustrated, the contact hole CH4 is located directly above the source line S2, and penetrates the insulating layers 16 and 17 to reach the metal wiring lines MT2. The second electrode E2 is made of a transparent conductive material, and is formed of, for example, the same material as that of the first electrode E1. Note that it suffices if a portion of the second electrode E2, which overlaps the area contributing to display is transparent, and the other portion may be of a nontransparent material.

The alignment film AL1 covers the insulating layer 17 and the second electrode E2. The alignment film AL1 is, for example, a polyimide film.

The liquid crystal layer LC is located on the first substrate SUB1. The liquid crystal layer LC may be of a positive type having a positive dielectric anisotropy or a negative type having a negative dielectric anisotropy.

The second substrate SUB2 is located on the liquid crystal layer LC. The second substrate SUB2 comprises a support substrate 20, light-shielding layers BM, color filters CF, an insulating layer 21, an alignment film AL2 and the like.

The polarizer PL2 is provided on the support substrate 20. The absorption axis of the polarizer PL1 and the absorption axis of the polarizer PL2 are set to be normal to each other in plan view.

The support substrate 20 is transparent and is made of, for example, glass such as borosilicate glass, but may be made of a resin such as plastic. The light-shielding layers BM are located underneath the support substrate 20 so as to be in contact with the support substrate 20. The light-shielding layers BM are located directly above the source lines S1 and S2, respectively. The color filters CF are located under the support substrate 20 and the light-shielding layers BM so as to be in contact with the support substrate 20 and the light-shielding layers BM. In the example illustrated, the color filters CF oppose the pixel electrode PE and are partially in contact with the light-shielding layers BM. The color filters CF include a red color filter, a green color filter, a blue color filter and the like. The color filters CF may be located on the first substrate SUB1. The color filters CF may include filters of four or more colors. For a pixel displaying a white color, a white color filter may be disposed, an uncolored resin material may be disposed or an overcoat layer OC maybe disposed without providing a color filter.

The insulating layer 21 is located under the color filters CF so as to be in contact with the color filters CF. The insulating layer 21 is a transparent organic insulating layer, and is made of, for example, a resin such as acryl resin. The alignment film AL2 is located under the insulating layer 21 so as to be in contact with the insulating layer 21 and cover the insulating layer 21. The alignment film AL2 is an optical-alignment polyimide film.

Figure 5:
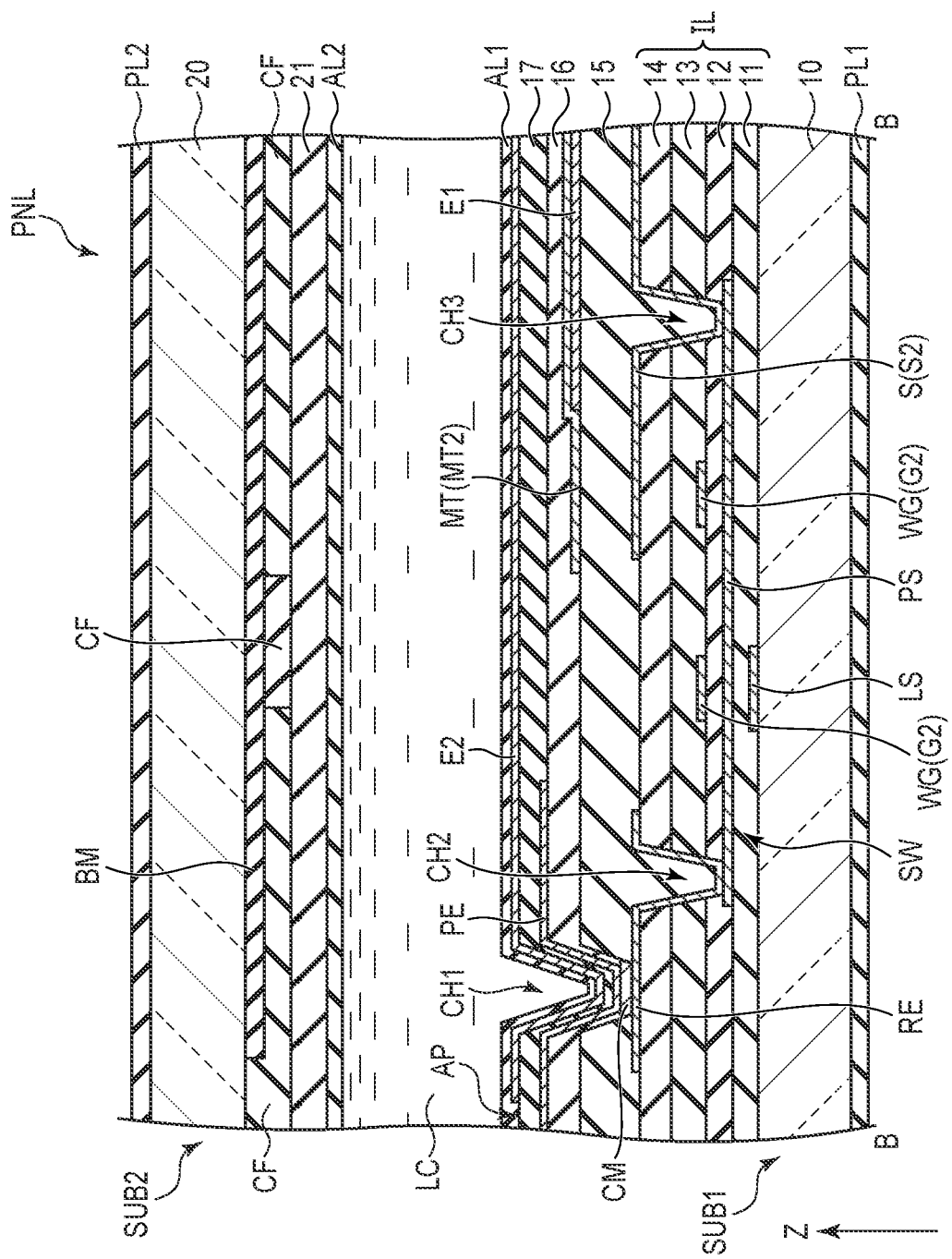
FIG. 5 is a cross-sectional view of the display panel taken along line B-B in FIG. 3.

FIG. 5 is a cross-sectional view of the display panel PNL taken along line B-B in FIG. 3. Note that, here, portions different from those of the cross-sectional view shown in FIG. 4 will be mainly described.

The first substrate SUB1 comprises a light-shielding layer LS, a switching element SW, a conductive material CM, a metal wiring line MT (MT2), a drain electrode RE and the like. The light-shielding layer LS is located between the support substrate 10 and the insulating layer 11 so as to be in contact with an upper surface of the support substrate 10. The light-shielding layer LS is made of, for example, a molybdenum-tungsten alloy. The switching element SW comprises a semiconductor layer SC. In the example illustrated, the semiconductor layer PS is located between the insulating layer 11 and the insulating layer 12 so as to be in contact with an upper surface of the insulating layer 11. The semiconductor layer PS is made of, for example, polycrystalline silicon. Note that the semiconductor layer 15 may as well be made of an oxide semiconductor layer. When it is made of oxide semiconductor, the semiconductor layer PS may be placed in a position except those between the insulating layer 11 and the insulating layer 12. The gate electrode WG, which is a part of the gate line G (G2) is located between the insulating layer 12 and the insulating layer 13 so as to be in contact with an upper surface of the insulating layer 12. The drain electrode RE is located between the insulating layer 14 and the insulating layer 15 so as to be in contact with an upper surface of the insulating layer 14. The drain electrode RE extends to the contact hole CH2 so as to be in contact with an upper surface of the semiconductor layer PS. The contact hole CH2 penetrates the insulating layers 12 to 14 to reach the semiconductor layer PS. The source line S2 extends to the contact hole CH3 so as to be in contact with the upper surface of the semiconductor layer PS. The contact hole CH3 penetrates the insulating layers 12 to 14 to reach the semiconductor layer PS. The conductive material CM covers the drain electrode RE in the contact hole CH1. In other words, the conductive materials CM is in contact with the drain electrode RE in the contact hole CH1. The metal wiring line MT2 is located between the first electrode E1 and the insulating layer 15 and the insulating layer 16 so as to be in contact with upper surfaces of the first electrode E1 and the insulating layer 15. The insulating layer 16 is located on the metal wiring line MT2, the insulating layer 15 and the conductive material CM so as to be in contact with the metal wiring line MT2, the insulating layer 15 and the conductive material CM. The pixel electrode PE extends to the contact hole CH1 so as to be in contact with the conductive material CM. In other words, the pixel electrode PE is electrically connected to the drain electrode RE through the conductive material CM. The contact hole CH1 penetrates the insulating layer 15 to reach the drain electrode RE. Note that the gate electrode WG and the light-shielding layer LS should preferably be, for example, electrically connected to each other and be at the same potential.

The second substrate SUB2 comprises a light-shielding layer BM and the like. The light-shielding layer BM is located on the gate electrode WG and the contact hole CH1 between the support substrate 20 and the insulating layer 21.

FIG. 6 is a cross-sectional view of the display panel PNL taken along line C-C in FIG. 3. Note that, here, portions different from those of the cross-sectional views shown in FIGS. 4 and 5 will be mainly described.

In the example illustrated, the contact hole CH1 penetrates the insulating layer 15 to reach the insulating layer 14. The drain electrode RE is located between the source lines S1 and S2 arranged along the first direction X with an interval therebetween. The drain electrode RE is exposed from the insulating layer 15 within the contact hole CH1. A width RW of the drain electrode RE along the first direction X is less than a width HW of the contact hole CH1 along the first direction X. The drain electrode RE comprises an end portion REE1 on a source line S1 side along the first direction X and an end portion REE2 on a source line S2 side. The end portions REE1 and REE2 of the drain electrode RE are each exposed from the insulating layer 15 and spaced away from the insulating layer 15 along the first direction X. The drain electrode RE is a three-level stacking film or the like, in which the metal layers ML1, ML2 and ML3 are stacked in order. The metal layers ML1 and ML3 are formed of, for example, a metal mainly composed of titanium, molybdenum and titanium, or a metal mainly composed of molybdenum. The metal layer ML2 is formed of, for example, aluminum or a metal mainly composed of aluminum. Note that it suffices if the drain electrode RE at least includes a layer formed of aluminum or a metal mainly composed of aluminum. Further, the drain electrode RE may be constituted by less than three layers, or more than three layers. The insulating layer 14 includes an area AR1 exposed from the insulating layer 15 between the insulating layer 15 and the end portion REE1 and an area AR2 exposed from the insulating layer 15 between the insulating layer 15 and the end portion REE2 in the contact hole CH1. The conductive material CM covers an upper surface of the drain electrode RE and the end portions REE1 and REE2 in the contact hole CH1. The conductive material CM is in contact with the area AR1 and the area AR2. Note that it suffices if the conductive material CM covers a part which may be removed in etching or the like during preparation of the first substrate SUB1, that is, for example, the metal layer ML2. The conductive material CM is formed of a conductive material, for example, the same as conductive material as that of the metal wiring lines MT or the first electrode E1. The insulating layer 16 is located on the insulating layer 15, the metal wiring lines MT1 and MT2 and the conductive material CM, so as to be in contact with the insulating layer 15, the metal wiring lines MT1 and MT2 and the conductive material CM.

Figure 7:
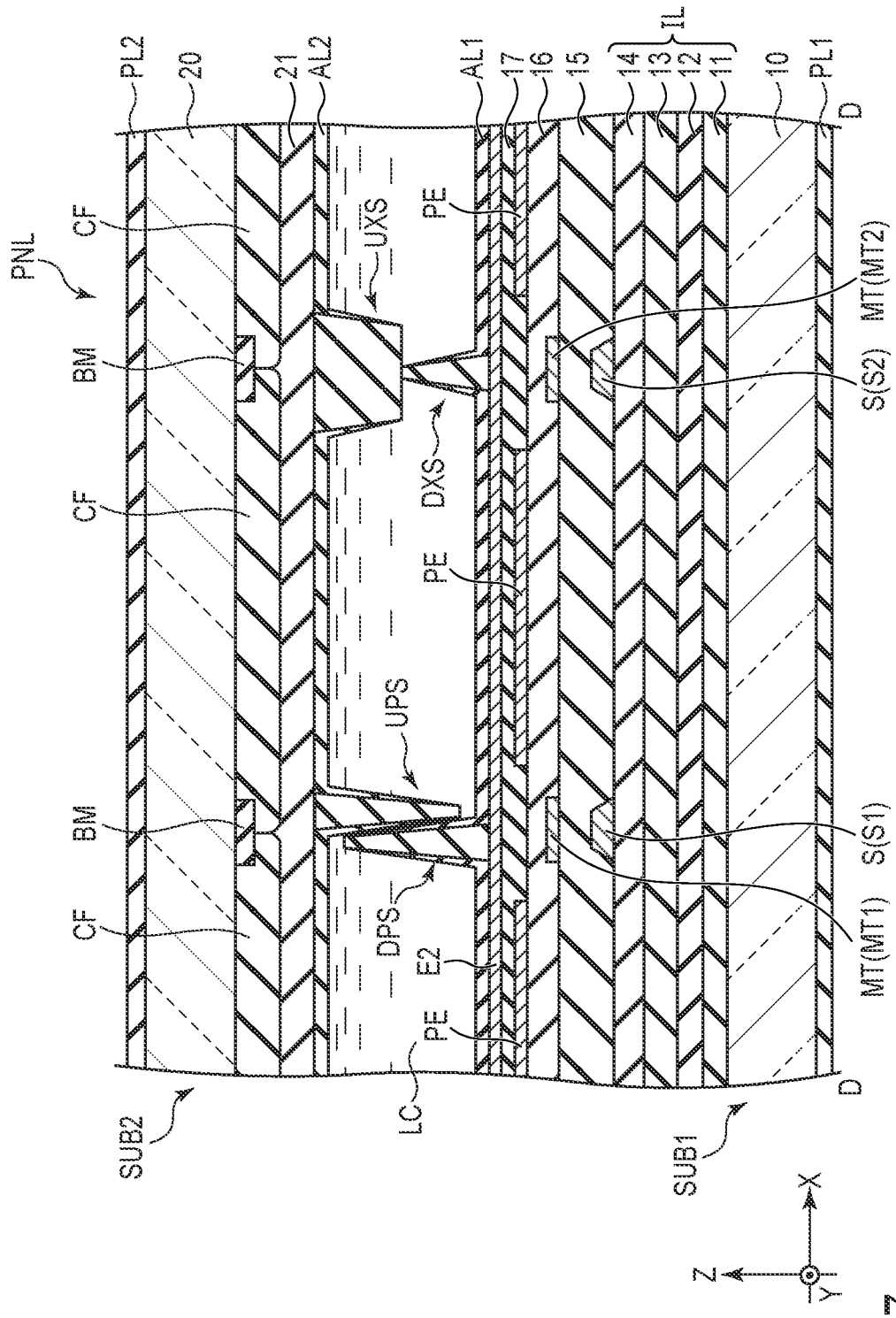
FIG. 7 is a cross-sectional view of the display panel taken along line D-D in FIG. 3.

FIG. 7 is a cross-sectional view of the display panel PNL taken along line D-D in FIG. 3. Note that, here, portions different from those of the cross-sectional views shown in FIGS. 4 and 6 will be mainly described.

The first substrate SUB1 comprises spacers DPS and DXS and the like. In the example illustrated, the spacer DPS is located on the second electrode E2 directly above the source line S1 so as to be in contact with the second electrode E2. The spacer DPS projects towards the second substrate SUB2. The cross-section of the spacer DPS is formed into a tapered shape narrowing down to a distal end portion located on the second substrate SUB2 side. Note that the cross-section of the spacer DPS may be formed into a shape other than the tapered shape. The spacer DXS is located on the second electrode E2 directly above the source line S2 so as to be in contact with the second electrode E2. The spacer DXS projects towards the second substrate SUB2. The cross-section of the spacer DXS is formed into a tapered shape narrowing down the distal end located on the second substrate SUB2 side. Note that the cross-section of the spacer DXS may be formed into a shape other than a tapered shape. The alignment film AL1 covers the second electrode E2, side surfaces of the spacer DPS and side surfaces of the spacer DXS.

The second substrate SUB2 comprises spacers UPS and UXS and the like. In the example illustrated, the spacer UPS is placed in a position shifted from the spacer DPS along the first direction X. The spacer UPS is located under the insulating layer 21 directly above the source line S1 so as to be in contact with the insulating layer 21. The spacer UPS projects towards the first substrate SUB1. The cross-section of the spacer UPS is formed into a tapered shape narrowing down towards the distal end located on the first substrate SUB1 side. Note that the cross-section of the spacer UPS may be formed into a shape other than the tapered shape. When a force is applied to the first substrate SUB1 and the second substrate SUB2 along the first direction X, the spacer DPS and the spacer UPS engage with each other, thereby inhibiting the first substrate SUB1 and the second substrate SUB2 shifting in the first direction X. The spacer UXS is located under the insulating layer 21 directly above the source line S2 so as to be in contact with the insulating layer 21. The spacer UXS projects towards the first substrate SUB1. The cross-section of the spacer UXS is formed into a tapered shape narrowing down towards the distal end portion located on the first substrate SUB1 side. Note that the cross-section of the spacer UXS may be formed into a shape other than the tapered shape. The distal end portion of the spacer UXS is in contact with the distal end portion of the spacer DXS. The spacer UXS extends further than the spacer DXS in the first direction X. Therefore, even if a force is applied to the first substrate SUB1 and the second substrate SUB2 in the first direction X to shift the first substrate SUB1 and the second substrate SUB2 in the first direction X, it is possible to inhibit the spacer UXS from disengaging from the spacer DXS.

According to this embodiment, the display device DSP comprises an insulating layer 14, an insulating layer 15 located on the insulating layer 14 and comprising a contact hole CH1, a drain electrode RE located on the insulating layer 14 and exposed from the insulating layer 15 within the contact hole CH1, a first electrode E1 located on the insulating layer 15, metal wiring lines MT located on the insulating layer 15 and the first electrode E1 and in contact with the first electrode E1, and a conductive material CM covering the drain electrode RE within the contact hole CH1. In the drain electrode RE, the metal layers ML1, ML2 and ML3 are stacked one on another. The metal layer ML2 is formed of, for example, aluminum or a metal mainly composed aluminum. The drain electrode RE includes an end portion REE1 and an end portion REE2. The end portions REE1 and REE2 are each spaced apart from the insulating layer 15 along the first direction X. The conductive material CM is formed of, for example, the same material as that of the metal wiring lines MT or the first electrode E1. The conductive material CM covers the upper surface of the drain electrode RE and the end portions REE1 and REE2 within the contact hole CH1. Therefore, in the manufacturing process of the display device DSP, for example, in a step of etching metal wiring lines MT, it is possible to inhibit the drain electrode RE, for example, the metal layer ML2 thereof, from being removed by the etching or the like. Thus, a display device DSP with an improved reliability can be provided.

Note that the display device DSP is limited to the configuration example described above, but may be of a configuration that the first electrode E1 and the second electrode E2 are replaced by pixel electrodes and the pixel electrodes PE are replaced by electrodes of a common potential.

Next, other configuration examples of the first embodiment will be described with reference to FIGS. 8 to 10, respectively. In the other configuration examples of the first embodiment described below, portions similar to those of the first embodiment are denoted by the same reference numerals and detailed explanation thereof is omitted, and portions different from those of the above-explained embodiment will be particularly explained in detail. Note that, in the other configuration examples, an advantageous effect similar to that of the above-described first embodiment can be also obtained.

Figure 8:
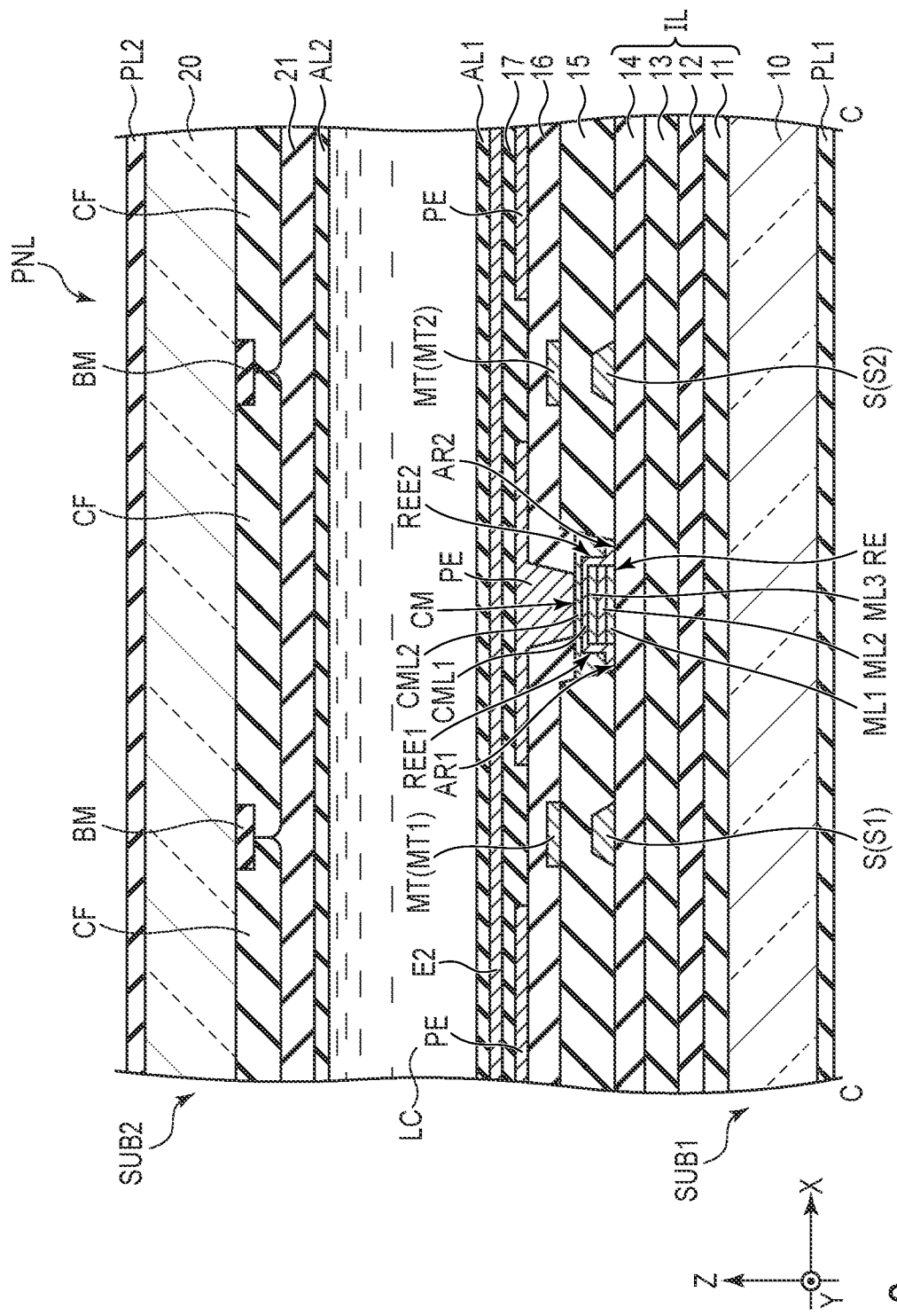
FIG. 8 is a cross sectional view of a display panel according to another configuration example of the display device of the first embodiment.

The configuration example shown in FIG. 8 is different from the example of FIG. 6 in the structure of the conductive material CM. In the conductive material CM, a first conductive layer CML1 and a second conductive layer CML2 are stacked in this order. The first conductive layer CML1 is formed of, for example, the same material as that of the first electrode E1. The second conductive layer CML2 is formed of, for example, the same material as that of the metal wiring lines MT. In this configuration example as well, an advantageous effect similar to that of the first embodiment can be obtained.

Figure 9:
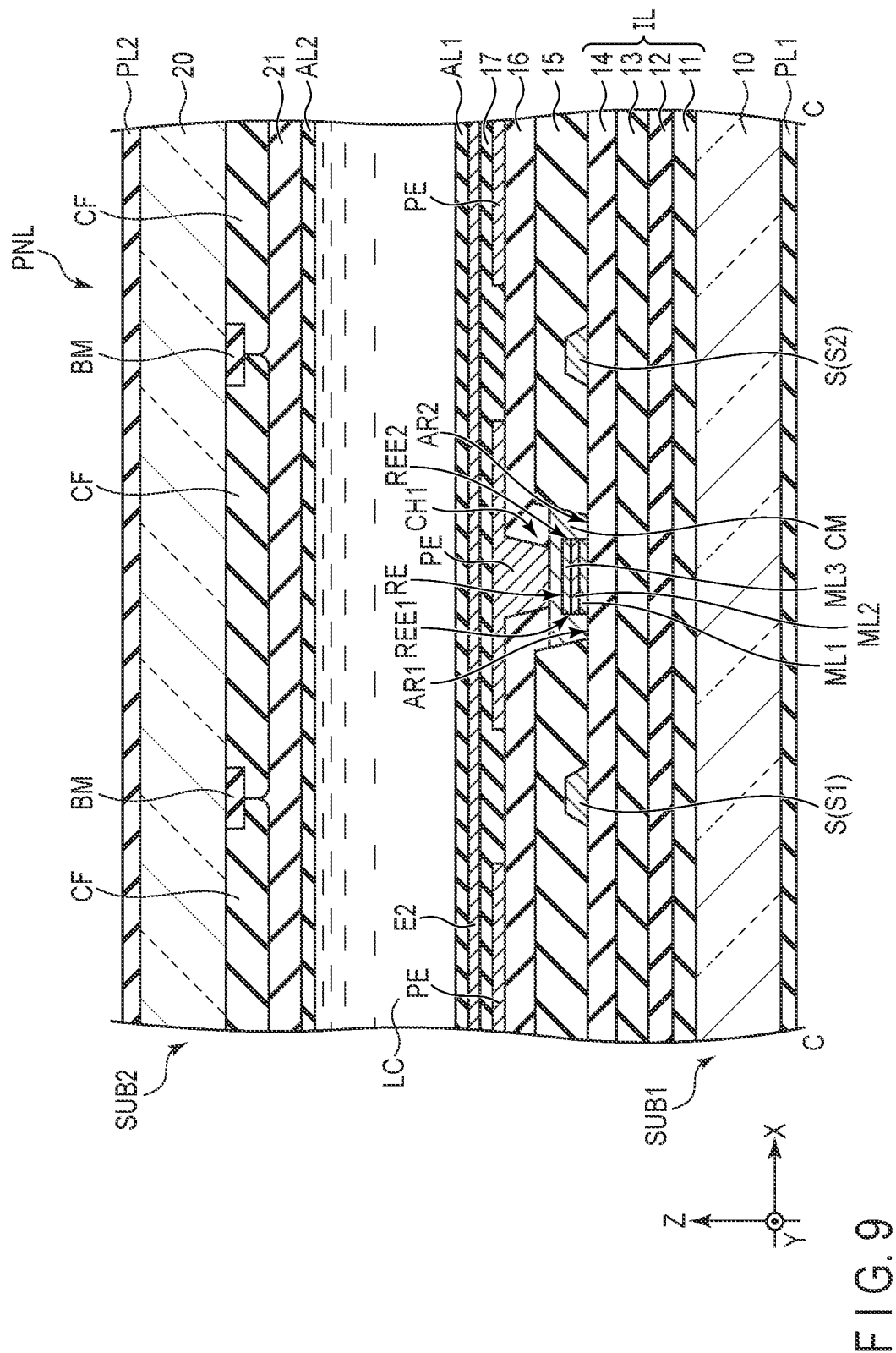
FIG. 9 is a cross sectional view of a display panel according to still another configuration example of the display device of the first embodiment.

The configuration example shown in FIG. 9 is different from that of the example of FIG. 6 in that the first substrate SUB1 does not comprise metal wiring lines MT. The insulating layer 16 located on the insulating layer 15 so as to be in contact with the insulating layer 15. The conductive materials CM is formed of, for example, the same material as that of the first electrode E1. In this configuration example as well, an advantageous effect similar to that of the first embodiment can be obtained.

Figure 10:
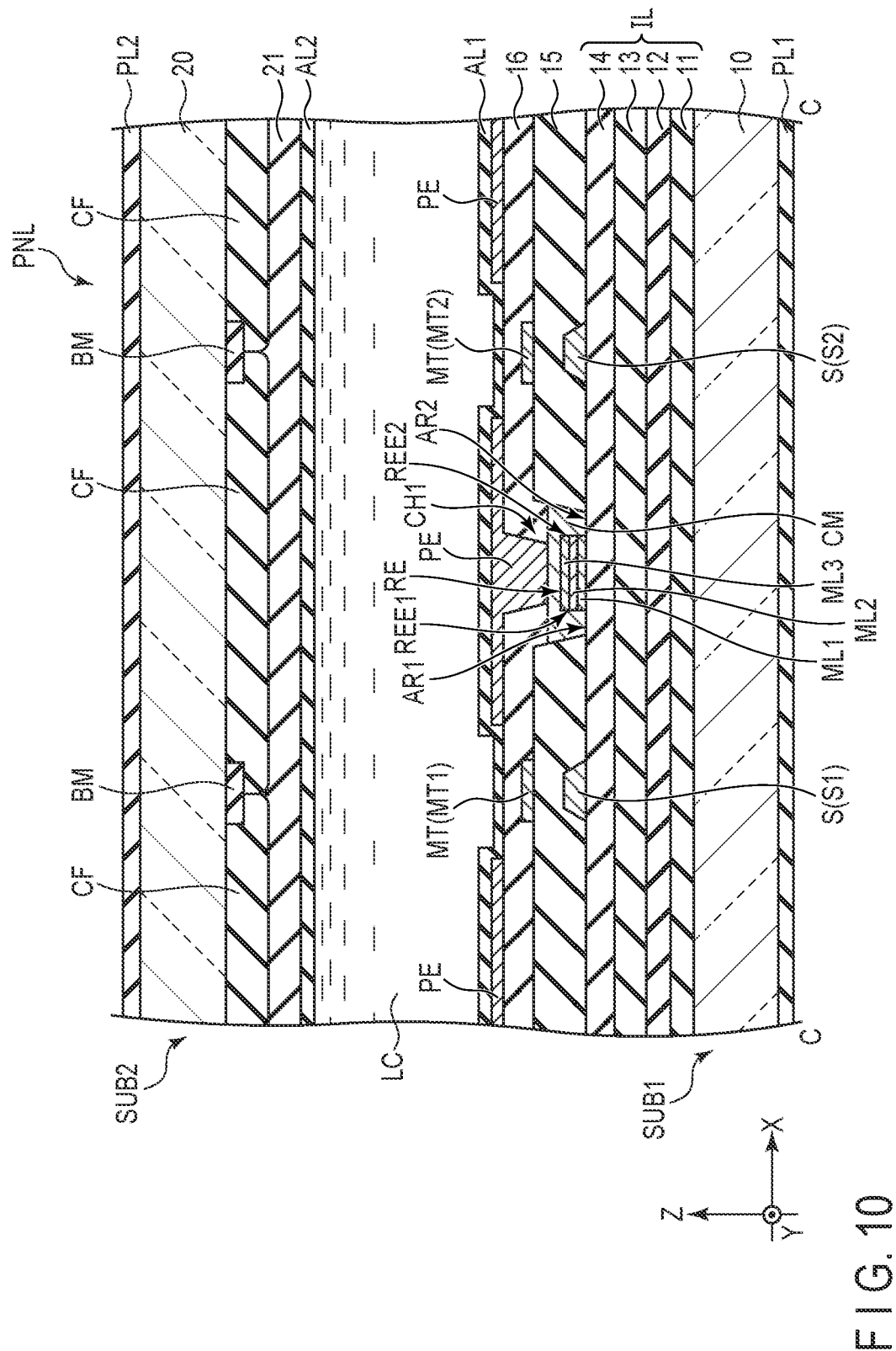
FIG. 10 is a cross sectional view of a display panel according to still another configuration example of the display device of the first embodiment.

The configuration example shown in FIG. 10 is different from that of the example of FIG. 6 in the structure of the first substrate SUB1. The first substrate SUB1 does not comprise the insulating layer 17 or the second electrode E2. The first alignment film AL1 covers the insulating layer 16 and the pixel electrodes PE. In this configuration example as well, an advantageous effect similar to that of the first embodiment can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
a first insulating layer;
a first source line and a second source line located on the first insulating layer and arranged with an interval therebetween;
an organic insulating layer located on the first insulating layer, the first source line and the second source line and comprising a contact hole;
a drain electrode located on the first insulating layer between the first source line and the second source line and exposed from the organic insulating layer in the contact hole;
a conductive material covering the drain electrode in the contact hole;
a second insulating layer located on the organic insulating layer;
a pixel electrode located above the second insulating layer and in the contact hole, and in direct contact with the conductive material and electrically connected to the drain electrode;
a first electrode located between the organic insulating layer and the second insulating layer;
a first metal wiring line overlapping the first source line and in contact with the first electrode; and
a second metal wiring line overlapping the second source line and in contact with the first electrode, wherein the conductive material being in contact with the first insulating layer exposed from the organic insulating layer between the organic insulating layer and the drain electrode in the contact hole.

2. The display device of claim 1, wherein the first insulating layer comprises a first area exposed from the organic insulating layer between the organic insulating layer and a first end portion of the drain electrode on a side of the first source line side and a second area exposed from the organic insulating layer between the organic insulating layer and a second end portion of the drain electrode on a side of the second source line, and the conductive material is in contact with the first area and the second area.

3. The display device of claim 1, wherein the conductive material is formed of a first material same as that of the first electrode.

4. The display device of claim 1, wherein the conductive material is formed of a second material same as that of the first metal wiring line and the second metal wiring line.

5. The display device of claim 1, wherein the conductive material is formed by staking the second material same as that of the first metal wiring line and the second metal wiring line on the first material same as that of the first electrode.

6. The display device of claim 1, wherein the first metal wiring line and the second metal wiring line are located above the first electrode.

7. The display device of claim 1, further comprising: a second electrode located on the pixel electrode and electrically connected to the first electrode.

8. The display device of claim 1, wherein the pixel electrode is in contact with an upper surface of the conductive material without being in contact with the drain electrode.

9. The display device of claim 1, wherein the drain electrode contains aluminum.

10. A display device comprising:
a first insulating layer;
a first source line and a second source line located on the first insulating layer and arranged with an interval therebetween;
an organic insulating layer located on the first insulating layer, the first source line and the second source line and comprising a contact hole;
a drain electrode located on the first insulating layer between the first source line and the second source line and comprising a first end portion on a side of the first source line exposed from the organic insulating layer in the contact hole and a second end portion on a side of the second source line;
a conductive material covering the first end portion and the second end portion in the contact hole;
a second insulating layer located on the organic insulating layer; and
a pixel electrode located on the second insulating layer and in the contact hole, in direct contact with the conductive material, and electrically connected to the drain electrode.

11. The display device of claim 10, further comprising: a first electrode located between the organic insulating layer and the second insulating layer,
wherein
the conductive material is formed of a first material same as that of the first electrode.

12. The display device of claim 10, further comprising: a first electrode located between the organic insulating layer and the second insulating layer, and a first metal wiring line overlapping the first source line and in contact with the first electrode,
wherein
the conductive material is formed of a second material same as that of the first metal wiring line.

13. The display device of claim 10, further comprising: a first electrode located between the organic insulating layer and the second insulating layer, and a first metal wiring line overlapping the first source line and in contact with the first electrode,
wherein
the conductive material comprises the first material same as that of the first electrode and a second material same as that of the first metal wiring line stacking one on another.

14. A display device comprising:
a first insulating layer;
a first source line and a second source line located on the first insulating layer and arranged with an interval therebetween;
an organic insulating layer located on the first insulating layer, the first source line and the second source line and comprising a contact hole;
a drain electrode located on the first insulating layer between the first source line and the second source line and exposed from the organic insulating layer in the contact hole;
a conductive material covering the drain electrode in the contact hole;
a second insulating layer located on the organic insulating layer;
a pixel electrode located on the second insulating layer and electrically connected to the drain electrode;
a first electrode located between the organic insulating layer and the second insulating layer; and
a first metal wiring line overlapping the first source line and in contact with the first electrode,
the conductive material being in contact with the first insulating layer exposed from the organic insulating layer between the organic insulating layer and the drain electrode in the contact hole, and the conducting material containing at least one of a first material same as that of the first electrode and a second material same as that of the first metal wiring line.

15. The display device of claim 14, wherein the conductive material contains the first material same as that of the first electrode and the second material same as that of the first metal wiring line stacking one on another.

* * * * *